J. R. REMINGTON.
Coffee Pot.
No. 4,904.
Patented Dec. 22, 1846.
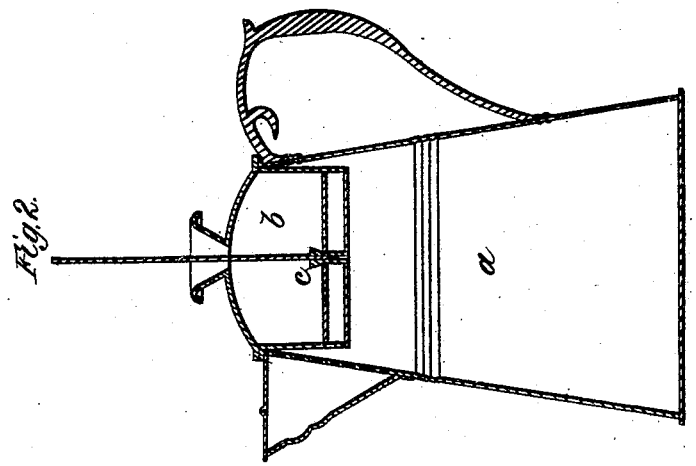
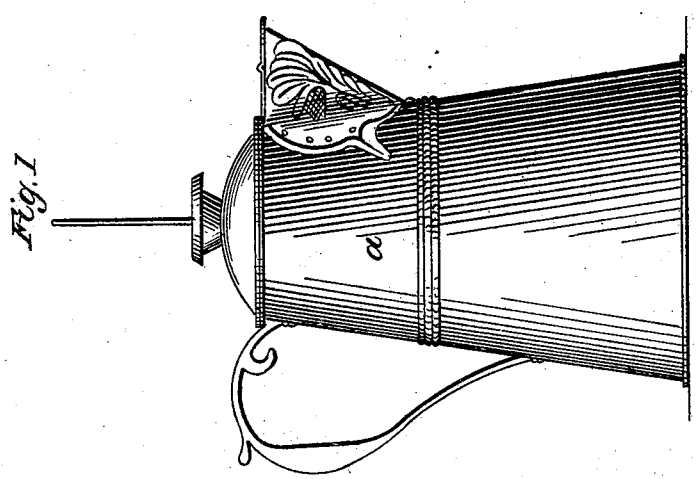

UNITED STATES PATENT OFFICE.

JOHN R. REMINGTON, OF LOWNDES COUNTY, ALABAMA.

COFFEE-POT.

Specification of Letters Patent No. 4,904, dated December 22, 1846.

*To all whom it may concern:*

Be it known that I, JOHN R. REMINGTON, of Lowndes county and State of Alabama, have invented a new and useful Improvement in Coffee-Pots, and the following is a full and exact description of the principle or character thereof, which distinguishes it from all other things before known, and of the manner of making, constructing, and using the same, reference being had to the accompanying drawings, making part of this specification, in which—

Figure 1 is an elevation of the coffee pot, and Fig. 2 a vertical section through the same.

The same letters indicate like parts in all the figures.

It has been found desirable to extract the aroma from coffee at a temperature above what can be produced under atmospheric pressure viz, 212° but in order to effect this end either a very expensive apparatus was required or great danger would ensue from the pressure.

By the simple arrangement used in my improvement I obviate both of these difficulties and am enabled to use a tin coffee pot which will cost no more than the common one and will be perfectly safe while the aroma is entirely retained by condensing the steam that would otherwise escape. The arrangement is as follows: I employ a common coffee pot ($a$) with a nose stopper, and insert a reservoir ($b$) therein that closes the top steam tight. This pot is made strong enough to resist the pressure within which would never exceed that of the atmosphere more than enough to raise the temperature two or three degrees above the boiling point or 212°. The reservoir above named is filled with cold water and after the coffee and water sufficient are put into the pot the reservoir is fastened on; in the bottom of said reservoir which is made double to prevent condensation there is an aperture which is stopped by a valve ($c$) which I denominate a safety valve; this valve remains closed by its weight until the pressure in the pot rises above what is required when it is forced open but instead of allowing steam to escape there is a small quantity of water injected which condenses it and the process continues until a delightful extract is made retaining all the flavor of the coffee.

The space between the double bottom may be filled with wool or cotton to prevent the water from becoming heated.

Having thus fully described the nature of my improvement what I claim as new therein and desire to secure by Letters Patent is—

The connecting a reservoir having a double bottom as described with the coffee pot in the manner described by means of a safety valve constructed substantially in the manner and for the purpose set forth.

JOHN R. REMINGTON.

Witnesses:
A. P. BROWNE,
J. J. GRENOUGH.